United States Patent Office 3,082,193
Patented Mar. 19, 1963

3,082,193
METAL-POLYVINYLPYRROLIDONE COMPOUND AND PROCESS FOR PREPARING SAME
Meyer Mendelsohn, New York, N.Y., assignor, by mesne assignments, to Yardney International Corp., New York, N.Y., a corporation of New York
No Drawing. Filed Mar. 6, 1958, Ser. No. 719,514
8 Claims. (Cl. 260—88.3)

This invention relates to organo-metallic compounds and more particularly to the metallic compounds of vinyl polymers characterized by cyclic nitrogen-containing substituents in the polymeric structure.

Until now it has been difficult to form metal compounds of polyvinyl amines ($R_2NCH=CH_2$) and polyvinyl amides ($RCONRCH=CH_2$) and particularly those wherein the amine or amide groups are portions of heterocyclic radicals. The general formula representing polymers of this type is as follows:

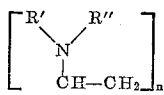

wherein R' and R'' are aliphatic chains linked to the nitrogen to form amines and amides and which may be linked to each other to form heterocyclic vinyl substituents. The heterocyclic groups may have various substituents on the ring including carboxyl groupings. A compound in this class, having both amine and amide linkages, is polyvinyl pyrrolidone with the structural formula

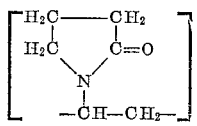

The $n$ of course is dependent on the degree of polymerization desired. In the case of the polyvinyl pyrrolidones the molecular weights may range from 10,000 to more than 100,000, depending on the desired physical properties. The reasons for the difficulty in the formation of such metal compounds were, first, the lack of an active free hydroxyl group on the molecule to which the metal might become attached to form a metallate and, second, the high complexing power of the polymeric molecule. In addition, certain of the heavier metals have been found to have the property of irreversibly precipitating (coagulating) the more protein-like polymers.

It is an object of this invention to provide metallo-organic compounds of water-soluble polyvinyl amines and polyvinyl amides having substituent heterocyclic groupings.

It is another object of this invention to provide a process for the reacting of such cyclo-vinyl compounds with metal-containing compounds to form metallo-cyclopolyvinyl compounds without irreversibly coagulating the polymers or complexing the metal.

It is a further object of this invention to provide a process for the preparation of polyvinylpyrrolidone metallates.

This invention is based on the selective activation of the polymer molecule by the presence of free-radical catalysts. Among such free-radical catalysts or agents having a high energy of formation, there may be mentioned solutions of hypochlorites, peroxides, oxides and ionic solutions which have been subjected to radiation at wavelengths shorter than those of the visible spectrum. It has been found that certain portions of heterocyclic polymer are activated when subjected to the presence of free-radical catalysts. They react then with metal compounds in suspension or solution to permit the direct attachment of the metal to the polymeric molecule. The tendency of the molecule to complex the metal is substantially eliminated by the presence of the free-radical catalyst. Among the free-radical catalysts particularly useful because of their great ease in handling are the oxides and peroxides of those metals which it is desired to introduce into the molecule. Formation of the free-radical catalysts may be carried out by the passage of ozone through liquids containing the polymeric material and ions of the desired metal, or by irradiation of such liquids with ultraviolet rays, X-rays and other forms of radiant energy of ultra-short wavelengths. The process of this invention is best carried out with the ingredients in solution. Multiphase reactions with one of the reactants in solid or gaseous form, admixed with the liquid phase of the other reactant, is also possible. For example, a solution of the polymer may be agitated with powdered metal oxide through which is bubbled nascent oxygen, nascent chlorine or ozone. It will be apparent that the nascent gases mentioned above may be derived from the decomposition of hydrogen peroxide or sodium-hypochlorite solutions by direct admixture with the reaction solutions.

Once the reaction is properly initiated by introduction of the free-radical catalyst, the rates of reaction are time- and temperature-dependent. By way of example, it is possible to mix a 10% solution of polyvinylpyrrolidone with a 10% silver-nitrate solution and have the mixture stand under normal, artificial, visible illumination for a period of 300 hours without any reaction having taken place. Subjecting the mixtures or solution to ultraviolet radiation from a quartz-tube ultraviolet-ray source for a period of 5 minutes will, however, initiate the reaction to such a degree that visible coloring is apparent. The reaction then proceeds to completion without any further extraneous activation. The time to completion of the reaction may be controlled by the temperature.

The various metal polyvinyl amines and amides of this invention have the same general physical properties as the original polymers such as film-forming ability, viscosity, or adherence. The additions of the metal substituents further have been found to impart to the polymer certain benefits directly attributable to these substituents. Thus, these new compounds are useful in the tanning and treatment of leathers, or for the modification of textile surfaces with respect to weighting, hand and lustre. Certain of the higher-metal compounds of this invention have shown intense in vitro antimicrobial activities while retaining the non-sensitizing, non-irritating characteristics of the polymer. Specifically, the silver-polyvinylpyrrolidone compound has an in vitro antimicrobial activity comparable to that of an equivalent amount of silver nitrate but shows none of the coagulating, staining and irritating characteristics of the latter when applied to living tissue.

The invention will now be described with reference to the following examples.

*Example 1*

5 grams of silver oxide ($Ag_2O$) was added to 100 grams of a 20% solution of polyvinylpyrrolidone (Plasdone-C, manufactured by Antara Products, of plasma-grade purity with an average molecular weight of 30,000). The suspension was mixed for ½ hour at room temperature, then the reaction mixture was heated to 60° C. and maintained at that temperature for ½ hour with constant agitation. The liquid changed from a clear colorless solution containing suspended black matter to a dark-brown solution. Upon filtration, it was found that the reaction product had no ionized silver when tested with NaCl test solution. The reaction mixture was cast into films and dried at 60° C. The dried film had a silver content of 6.7%.

*Example II*

100 grams of a 20% aqueous solution of polyvinylpyrrolidone (average molecular weight 60,000, obtained from the above source) was reacted with 5 grams of silver peroxide ($Ag_2O_2$) at room temperature with constant agitation. After 45 minutes the reaction mixture was filtered and the excess of silver peroxide removed. A dark-brown film-forming solution was obtained. Films dried in the manner of Example I contained approximately 7% silver.

*Example III*

To 100 grams of a 20% aqueous solution of polyvinylpyrrolidone, of average molecular weight 30,000, there was added 5 grams of cobaltous oxide and 1 cc. of ammonia test solution. The reaction mixture was agitated for 1 hour at room temperature and then the temperature of the mixture was raised to 65° C. and maintained at this temperature with constant agitation for 3 hours. The mixture was then filtered to yield a deep-blue filtrate having a cobalt concentration of 0.75%, equivalent to 3% of the solids.

*Example IV*

The reaction of Example I was carried out with the modification that the solution of polyvinylpyrrolidone was a 20% solution in methyl alcohol instead of the aqueous solution of Example I. The resultant film had the same silver concentration as in Example I.

*Example V*

A 10% aqueous solution of polyvinylpyrrolidone was mixed with an equal portion of an aqueous 10% solution of silver nitrate. One-half of the reaction mixture was exposed to artificial fluorescent illumination of the so-called daylight type for 300 hours. No color change took place in this solution. The remaining half of the mixture was exposed for 5 minutes to ultra-violet radiation from a quartz-tube source. A definite darkening of the solution was noted. One-half of the irradiated material was maintained at room temperature and at the end of 30 hours was completely reacted and no longer contained ionized silver. The other half was heated at 50° C. for 1 hour, at the end of which time it was found to be free of ionized silver.

*Example VI*

To 100 grams of a 20% aqueous polyvinylpyrrolidone solution of average molecular weight 30,000 there was added 20 cc. of ferric-chloride test solution and 1 cc. of 35% hydrogen peroxide ($H_2O_2$). The reaction mixture maintained its own agitation for 1½ hours during which time the temperature of the reaction mixture was in the range of 40–50° C. The excess iron was precipitated by the addition of ammonia test solution and filtered. The filtrate had a deep reddish-brown coloration and an iron content of 4.9%.

*Example VII*

The procedure of Example VI was carried out with the exception that the solution of hydrogen peroxide was replaced by 5 grams of sodium-hypochlorite powder. The iron content of the final product was the same as that of Example VI.

It should be noted that since the reaction is based on the amount of free radical present in solution, this reaction may be used as a measure for detection of certain free-radical-forming agents such as ultraviolet radiation, X-rays and other high-intensity radiant-energy sources. Thus, for instance, the process of Example IV, wherein silver nitrate and polyvinylpyrrolidone mixtures where subjected to ultraviolet radiation, may be used as a medium for the detection of such radiation. In this fashion a simple colorimetric procedure for the determination of free-radical-forming radiation may be devised. In addition, since polyvinylpyrrolidone is a film-forming material, it will be apparent that suitable modification will yield a method for the taking of photographs of ultraviolet and other high-intensity, radiant-energy sources. By this means it is possible to photograph reactions in atomic reactors. It will be further noted that the products of this invention are of low ionization.

I claim:

1. A process for preparing a composition of low ionization of a heavy metal in association with polyvinylpyrrolidone which comprises reacting a water-soluble polyvinylpyrrolidone with a water-soluble heavy metal compound under conditions conducive to the formation of said metal association product until said association product is formed, said reaction being carried out in a medium selected from the group consisting of an aqueous medium and methyl alcohol and in which said heavy metal compound and said polyvinylpyrrolidone are soluble, said metal association product remaining in solution after the reaction, and said heavy metal compound being selected from the group consisting of silver oxide, silver peroxide, silver nitrate, cobaltous oxide, and ferric-chloride.

2. A process according to claim 1 wherein said heavy metal compound is silver nitrate.

3. A process according to claim 1 wherein said heavy metal compound is silver oxide.

4. A process according to claim 1 wherein said heavy metal compound is silver peroxide.

5. A process for preparing an iron metal compound of polyvinylpyrrolidone which comprises, reacting polyvinylpyrrolidone with a mixture of ferric-chloride and hydrogen peroxide in an aqueous medium in which said mixture of ferric-chloride and hydrogen peroxide and said polyvinylpyrrolidone are soluble under the conditions of reaction and in which the iron reaction product remains in solution.

6. A process for preparing an iron metal compound of polyvinylpyrrolidone which comprises, reacting polyvinylpyrrolidone with a mixture of ferric-chloride and sodium hypochloride in an aqueous medium in which said mixture of ferric-chloride and sodium hypochlorite and said polyvinylpyrrolidone are soluble under the conditions of reaction and in which the iron reaction product remains in solution.

7. Products made by the process of claim 1.
8. Products made by the process of claim 2.

References Cited in the file of this patent

UNITED STATES PATENTS

| | | |
|---|---|---|
| 2,495,918 | Bolton | Jan. 31, 1950 |
| 2,642,410 | Hoppens | June 16, 1953 |
| 2,658,045 | Schildknecht | Nov. 3, 1953 |
| 2,692,826 | Neugebauer | Oct. 26, 1954 |
| 2,744,291 | Stastny et al. | May 8, 1956 |
| 2,834,676 | Stanley et al. | May 13, 1958 |

OTHER REFERENCES

Basu et al.: "Die Makromelkular Chemie," vol. 25, pages 210–216, October 1957.

Lesser: "Drug and Cosmetic Industry," vol. 75, No. 1, July 1954, page 128.